United States Patent
Dai et al.

(10) Patent No.: US 11,156,539 B2
(45) Date of Patent: Oct. 26, 2021

(54) METHOD FOR EVALUATING BIOAVAILABILITY OF ORGANIC SOLID WASTE BY ANAEROBIC CONVERSION BASED ON FRACTAL DIMENSION

(71) Applicant: TONGJI UNIVERSITY, Shanghai (CN)

(72) Inventors: Xiaohu Dai, Shanghai (CN); Yu Hua, Shanghai (CN); Chen Cai, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/109,300

(22) Filed: Dec. 2, 2020

(65) Prior Publication Data
US 2021/0164877 A1 Jun. 3, 2021

(30) Foreign Application Priority Data
Dec. 2, 2019 (CN) .......................... 201911213175.X

(51) Int. Cl.
*G01N 15/02* (2006.01)
(52) U.S. Cl.
CPC ................ *G01N 15/0205* (2013.01)
(58) Field of Classification Search
CPC ....... Y02E 50/30; C12M 21/04; C12M 45/04; C02F 11/04
See application file for complete search history.

(56) References Cited

U.S. PATENT DOCUMENTS 4,022,665 A * 5/1977 Ghosh ..................... C12P 5/023
 435/167
4,597,872 A * 7/1986 Andersson ................ C02F 3/30
 210/605
(Continued)

FOREIGN PATENT DOCUMENTS

CN 102445555 A 5/2012
CN 106939294 A 7/2017
(Continued)

OTHER PUBLICATIONS

Wang et al. "Fractal-like kinetics of the solid-state anaerobic digestion" Jul. 2016, Waste Management, vol. 53, pp. 55-61.*

*Primary Examiner* — Kara E. Geisel
*Assistant Examiner* — Jarreas C Underwood

(57) ABSTRACT

Provided is a method for evaluating a bioavailability of organic solid waste by an anaerobic conversion based on fractal dimension, relating to anaerobic digestion of organic solid waste. Organic solid waste is broken up and dried, and the organic solid waste is analyzed using a laser particle size analyzer, so as to measure a wave vector Q and a scattering intensity I. The wave vector Q and the scattering intensity I are analyzed using a data processing software, and a two-dimensional fractal dimension $D_f$ is obtained based on a fractal theory. A volatile fatty acid maximum $VFA_{max}$ and a biochemical methane potential BMP of the organic solid waste are predicted according to the two-dimensional fractal dimension $D_f$, so as to evaluate a bioavailability of organic solid waste by an anaerobic conversion.

5 Claims, 3 Drawing Sheets

(56) References Cited

U.S. PATENT DOCUMENTS

| | | | | |
|---|---|---|---|---|
| 4,915,840 | A * | 4/1990 | Rozich | C02F 3/1221 |
| | | | | 210/605 |
| 5,530,551 | A * | 6/1996 | Cantrall | G01N 33/362 |
| | | | | 356/394 |
| 6,905,600 | B2 * | 6/2005 | Lee, Jr. | C05F 17/10 |
| | | | | 210/603 |
| 7,226,539 | B2 * | 6/2007 | Dong | C02F 3/2806 |
| | | | | 210/259 |
| 7,920,994 | B2 * | 4/2011 | Palsson | G16B 5/00 |
| | | | | 703/2 |
| 9,102,550 | B2 * | 8/2015 | Shinto | C02F 3/286 |
| 2006/0150527 | A1 * | 7/2006 | Ohara | B82Y 30/00 |
| | | | | 51/308 |
| 2007/0158264 | A1 * | 7/2007 | Zhang | C02F 3/34 |
| | | | | 210/603 |
| 2009/0272687 | A1 * | 11/2009 | Chiang | C02F 3/1221 |
| | | | | 210/605 |
| 2010/0255562 | A1 * | 10/2010 | Kang | C05F 3/00 |
| | | | | 435/262 |
| 2011/0151533 | A1 * | 6/2011 | Downey | C12M 21/04 |
| | | | | 435/167 |
| 2011/0181869 | A1 * | 7/2011 | Yamaguchi | G01N 15/0205 |
| | | | | 356/72 |

FOREIGN PATENT DOCUMENTS

| | | |
|---|---|---|
| CN | 107022574 A | 8/2017 |
| CN | 207632814 U | 7/2018 |
| CN | 108830429 A | 11/2018 |
| CN | 108872454 A | 11/2018 |

\* cited by examiner

METHOD FOR EVALUATING BIOAVAILABILITY OF ORGANIC SOLID WASTE BY ANAEROBIC CONVERSION BASED ON FRACTAL DIMENSION

CROSS-REFERENCE TO RELATED APPLICATIONS

This application claims the benefit of priority from Chinese Patent Application No. 201911213175.X, filed on Dec. 2, 2019. The content of the aforementioned application, including any intervening amendments thereto, is incorporated herein by reference in its entirety.

TECHNICAL FIELD

This application relates to anaerobic digestion of organic solid waste, and more particularly to a method for evaluating a bioavailability of organic solid waste by an anaerobic conversion based on fractal dimension.

BACKGROUND

Anaerobic digestion is a series of biological processes in which organic solid waste is broken down through microbial fermentation to produce biogases, and the digested effluent and digested sludge are reused in farmland. The biogas industry has drawn worldwide attentions, for example, there are more than 10,000 straw biogas projects in Germany. However, current technologies in biogas projects are limited due to the wide temporal and spatial distribution of raw materials and the variety thereof. In addition, the organic solid waste, such as straws, usually has a natural anti-degradation barrier and a solid lignocellulose substrate, which leads to a low gas production efficiency and a long fermentation cycle. Thus, a pretreatment that effectively breaks the barrier and improves a bioavailability of the organic solid waste is significant for the biogas projects.

There is no exact standard for evaluating the bioavailability of anaerobic digestion for the organic solid waste collected in different areas, the organic solid waste of different kinds, the organic solid waste collected at different times or the organic solid waste pretreated by different methods. The common evaluation is an empirical standard that is based on color changes, pretreatment time and environmental conditions, or a time-consuming experiment for measuring an anaerobic biotransformation potential for 30-60 days in the laboratory with professional instruments. Therefore, an effective and scientific method for evaluating a bioavailability of organic solid waste is imperative.

SUMMARY

To solve the above-mentioned problems, the present disclosure provides a method for evaluating a bioavailability of organic solid waste by an anaerobic conversion based on fractal dimension, so as to evaluate potentials in a hydrolysis acidification process and a methane production process through one indicator.

The technical solutions of the present disclosure are described as follows.

A method for evaluating a bioavailability of organic solid waste by a biological anaerobic conversion based on fractal dimension, comprising:

1) collecting a sample of the organic solid waste, and drying and breaking up the sample to obtain a dried sample;

2) adding water into the dried sample obtained in step (1) followed by stirring to obtain a mixture;

3) analyzing the mixture obtained in step (2) using a laser particle size analyzer, so as to measure a wave vector Q and a scattering intensity I of the mixture;

4) according to a fractal theory, analyzing the wave vector Q and the scattering intensity I obtained in step (3) using a data processing software; and obtaining a two-dimensional fractal dimension $D_f$ of the sample according to a formula $I \propto Q^{-D_f}$;

5) constructing a calculation model of the fractal dimension $D_f$ and a volatile fatty acid maximum ($VFA_{max}$) or a biochemical methane potential (BMP) using linear regression; and 6) plugging the fractal dimension $D_f$ of the sample into the calculation model obtained in step (5) to obtain the $VFA_{max}$ and the BMP of the sample, so as to evaluate the bioavailability of the organic solid waste.

In some embodiments, in step (1), the sample is organic solid waste pretreated by different methods, organic solid waste collected from different areas, organic solid waste of different kinds or organic solid waste collected at different times.

In some embodiments, the organic solid waste is broken up to 0.01-3500 μm.

In some embodiments, in step (2), the sample is diluted with pure water in a container to obtain the mixture with a solid content less than 5%, and the mixture is fully stirred by an external magnetic stirrer having a magnetic stirring bar. The container and the magnetic stirring bar are cleaned and dried before use.

In some embodiments, in step (3), a light source of the laser particle size analyzer is a helium-neon laser emitting at 633 nm. A refractive index of a dispersant is 1.330. An absorption rate of particles in the dispersant is 0.100. A density of the dispersant is greater than 1. The dispersant is water. Time for a background measurement is 10 s. Time for measuring the mixture is 10-12 s. Time for measuring the mixture with uneven dispersion is 10-20 s. The mixture is measured 3 times. During a measurement, a shading range of the mixture containing particles having a diameter of tens of microns is 10-20%; a shading range of the mixture containing particles having a diameter of a few microns is 6-10%; a shading range for the mixture containing particles have a diameter of hundreds of nanometers is 4-6%; a shading range of the mixture with uneven dispersion is 10-20%. A stirring speed is 2000-3000 r/min. After the mixture is measured, a cleaning system of the laser particle size analyzer is operated.

In some embodiments, in step (4), the formula $I \propto Q^{-D_f}$ is an equation $I = k \cdot Q^{-D_f}$, where k is a slope. Both sides of the equation take the natural logarithm to obtain: $\ln I = \ln (k \cdot Q^{-D_f})$, and then the equation is simplified as: $\ln I = -D_f \ln Q + \ln k$. The I and Q obtained in step (3) take the natural logarithm to obtain lnI and lnQ which are taken as a dependent variable and an independent variable, respectively, and the fractal dimension $D_f$ of the sample is obtained using linear fitting.

In some embodiments, in step (5), the calculation model of the fractal dimension $D_f$ and the $VFA_{max}$ or the BMP of the sample is:

$$Y = A - BX,$$

where X is the fractal dimension $D_f$; Y is the $VFA_{max}$ or the BMP of the sample; and A and B are coefficients of the calculation model corresponding to the $VFA_{max}$ or the BMP.

In some embodiments, in step (6), the $VFA_{max}$ is a maximum cumulative value of a volatile organic acid in a hydrolysis acidification process without methane production, where a carbon chain of the volatile organic acid usually has 1-6 carbon atoms, and the BMP is a maximum potential for bioconversion of organic matter in the sample into methane in an anaerobic process.

The beneficial effects of the present invention are described as follows.

1) The method of the present invention is simple to operate, and measurement values can be obtained by using a data processing software and a laser particle size analyzer, which is time- and energy-saving.

2) Compared to the prior art, the method provided herein is more effective. Parameters used in this method are not results indicators such as cumulative concentrations of volatile fatty acids and biochemical methane potentials, but properties of source materials for biological conversion. Properties of the organic solid waste are significant for biological anaerobic conversion. The method of the present invention evaluates the bioavailability of organic solid waste by an anaerobic conversion based on fractal dimension.

BRIEF DESCRIPTION OF THE DRAWINGS

The technical solutions of this disclosure and the prior art are described more clearly below with reference to the accompany drawings. It should be noted that the accompany drawings are some embodiments of this disclosure, and for those skilled in the art, other drawings can be obtained without creative work.

DETAILED DESCRIPTION OF EMBODIMENTS

Figure 1:
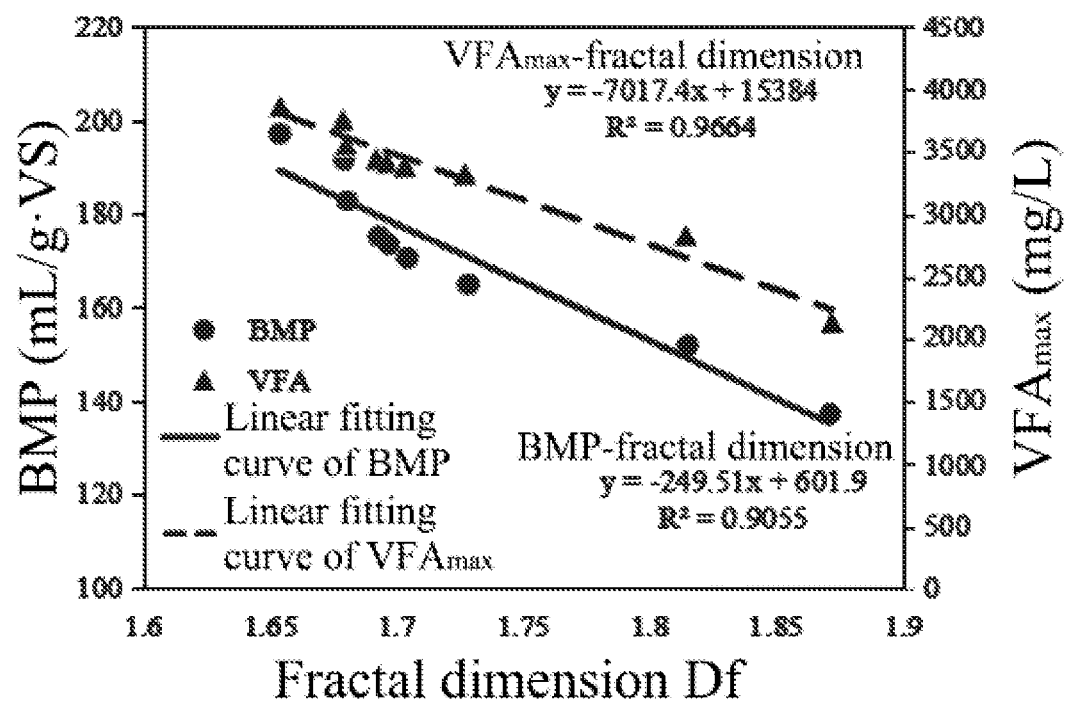
FIG. 1 shows fitting curves for evaluating bioavailabilities of rice straws with different particle sizes by an anaerobic conversion based on fractal dimension according to an embodiment of the present disclosure.

The technical solutions and features of present disclosure will be further described in detail with reference to accompanying drawings. The embodiments are illustrative, and not intended to limit the scope of the present disclosure.

It should be understood that the terms used herein are illustrative, and not intended to limit the present disclosure. Numerical ranges disclosed herein include any numerical values and ranges within the disclosed range.

Unless otherwise specified, all technical and scientific terms used herein have the same meaning as commonly understood by those skilled in the art. All documents mentioned in this description are incorporated by reference to disclose and describe methods and/or materials related to the documents. In case of conflicted with any incorporated document, the contents of this description shall prevail.

The description and embodiments are illustrative, and for those skilled in the art, it is obvious to make modifications and changes without departing from the scope and spirit of this disclosure.

A method for evaluating a bioavailability of organic solid waste by an anaerobic conversion based on fractal dimension includes the following steps.

1) A sample of the organic solid waste is collected, and the sample is dried and broken up to obtain a dried sample;

2) The dried sample obtained in step (1) is added into water and stirred to obtain a mixture.

3) The mixture obtained in step (2) is analyzed using a laser particle size analyzer, so as to measure a wave vector Q and a scattering intensity I of the mixture.

4) According to a fractal theory, the wave vector Q and the scattering intensity I obtained in step (3) are analyzed using a data processing software, and a two-dimensional fractal dimension $D_f$ of the sample is obtained according to a formula $I \propto Q^{-D_f}$.

5) Based on data from documents and experiments, a calculation model of the fractal dimension $D_f$ and a volatile fatty acid maximum ($VFA_{max}$) or a biochemical methane potential (BMP) is constructed using linear regression.

6) The fractal dimension $D_f$ of the sample is plugged into the calculation model obtained in step (5), and the $VFA_{max}$ and the BMP of the sample are calculated, so as to evaluate the bioavailability of the organic solid waste.

In step (1), the sample is organic solid waste pretreated by different methods, such as hydrothermal treatment; hydrothermal treatment and potassium hydroxide treatment; and hydrothermal treatment and acetic acid treatment. The sample can also be organic solid waste collected from different areas, organic solid waste of different kinds or organic solid waste collected at different times.

In some embodiments, the organic solid waste includes but not limited to a straw.

In some embodiments, the straw is wheat bran, straw powders, wheat flour, a rape straw, a corn stalk or rice husk.

In some embodiments, the organic solid waste is broken up to 0.01-3500 μm, preferably 0.05-3 mm.

In step (2), the sample is diluted with pure water in a container to obtain the mixture with a solid content less than 5%, and the mixture is fully stirred by an external magnetic stirrer having a magnetic stirring bar. The container and the magnetic stirring bar are cleaned and dried before use.

In step (3), a light source of the laser particle size analyzer is a highly stable helium-neon laser emitting at 633 nm. A refractive index of a dispersant is 1.330. An absorption rate of particles in the dispersant is 0.100. A density of the dispersant is greater than 1. The dispersant is water. Time for a background measurement is 10 s. Time for measuring the mixture is 10-12 s. Time for measuring the mixture with uneven dispersion is 10-20 s. The mixture is measured 3 times. During a measurement, a shading range of a mixture containing particles having a diameter of tens of microns is 10-20%; a shading range of a mixture containing particles having a diameter of a few microns is 6-10%; a shading range of a mixture containing particles have a diameter of hundreds of nanometers is 4-6%; a shading range of a mixture with uneven dispersion is 10-20%. A stirring speed is 2000-3000 r/min. After the mixture is measured, a cleaning system of the laser particle size analyzer is operated before the following measurement.

In step (4), the formula $I \propto Q^{-D_f}$ is an equation $I = k \cdot Q^{-D_f}$, where k is a slope. Both sides of the equation take the natural logarithm to obtain: $\ln I = \ln(k \cdot Q^{-D_f})$, and then the equation is simplified as: $\ln = -D_f \ln Q + \ln k$. The I and Q obtained in step (3) take the natural logarithm to obtain lnI and lnQ which are taken as a dependent variable and an independent variable, respectively, and the fractal dimension $D_f$ of the sample is obtained using linear fitting.

In step (5), the calculation model of the fractal dimension $D_f$ and the $VFA_{max}$ or the BMP of the sample is:

$$Y = A - BX,$$

where X is the fractal dimension $D_f$; Y is the $VFA_{max}$ or the BMP of the sample; and A and B are coefficients of the calculation model corresponding to the $VFA_{max}$ or the BMP.

In step (6), the $VFA_{max}$ is a maximum cumulative value of a volatile organic acid in a hydrolysis acidification process without methane production, where a carbon chain of the volatile organic acid usually has 1-6 carbon atoms. The BMP is a maximum potential for bioconversion of organic matter in the sample into methane in an anaerobic process.

EXAMPLE 1

A method for evaluating a bioavailability of organic solid waste by an anaerobic conversion based on fractal dimension includes the following steps.

1) A sample of rice straw was collected, and dried and broken up to 0.05-3 mm to obtain a dried sample.

2) The dried sample obtained in step (1) was diluted with pure water in a container to obtain a mixture with a solid content less than 5%, and the mixture was fully stirred by an external magnetic stirrer having a magnetic stirring bar. The container and the magnetic stirring bar were cleaned and dried before use.

3) The mixture obtained in step (2) was analyzed using a laser particle size analyzer, so as to measure a wave vector Q and a scattering intensity I of the mixture. A light source of the laser particle size analyzer was a helium-neon laser emitting at 633 nm. A refractive index of a dispersant was 1.330. An absorption rate of particles in the dispersant was 0.100. A density of the dispersant was greater than 1. The dispersant was water. Time for a background measurement was 10 s. Time for measuring the mixture was 10-12 s. Time for measuring the mixture with uneven dispersion was 10-20 s. Each mixture was measured 3 times. During a measurement, a shading range of a mixture containing particles having a diameter of tens of microns was 10-20%; a shading range of a mixture containing particles having a diameter of a few microns was 6-10%; a shading range of a mixture containing particles have a diameter of hundreds of nanometers was 4-6%; and a shading range of a mixture with uneven dispersion was 10-20%. A stirring speed was 2000-3000 r/min. After each mixture was measured, a cleaning system of the laser particle size analyzer is operated before the following measurement.

4) Based on fractal theory, the wave vector Q and the scattering light intensity I obtained in step (3) were analyzed using a data processing software. According to the formula $I \propto Q^{-D_f}$, an equation $I = k \cdot Q^{-D_f}$ was obtained, where k was a slope. Both sides of the equation took the natural logarithm to obtain: $\ln I = \ln (k \cdot Q^{-D_f})$, and then the equation was simplified as: $\ln I = -D_f \ln Q + \ln k$. The I and Q obtained in step (3) took the natural logarithm to obtain lnI and lnQ which were taken as a dependent variable and an independent variable, respectively, and the fractal dimension $D_f$ of the rice straw was obtained using linear fitting.

5) According to data from documents and experiments, the fractal dimensions $D_f$ of rice straws pretreated by different methods, and corresponding volatile fatty acid maximums ($VFA_{max}$) and biochemical methane potentials (BMP) were obtained, and then were input into a data processing software to carry out the linear fitting to establish a model:

$Y = A - BX,$ where X was the fractal dimension $D_f$; Y was $VFA_{max}$ or BMP of the sample; and A and B were coefficients of the model corresponding to the $VFA_{max}$ or the BMP.

6) The fractal dimension $D_f$ of the rice straw was plugged into the calculation model established in step (5), and the $VFA_{max}$ and the BMP thereof were calculated, so as to evaluate a bioavailability of the rice straw. Table 1 showed the $D_f$, BMP and $VFA_{max}$ of rice straws with different particle sizes.

TABLE 1

| Particle diameter (mm) | $D_f$ | BMP | $VFA_{max}$ |
|---|---|---|---|
| 3 | 1.8712 | 137.1477 | 2159.795 |
| 1 | 1.8151 | 151.8135 | 2804.525 |
| 0.9 | 1.7282 | 164.8434 | 3294.146 |
| 0.7 | 1.7042 | 170.5412 | 3365.483 |
| 0.6 | 1.6968 | 173.4151 | 3397.415 |
| 0.5 | 1.6928 | 175.1045 | 3427.418 |
| 0.2 | 1.6805 | 182.7405 | 3536.581 |
| 0.1 | 1.6792 | 191.5153 | 3715.915 |
| 0.05 | 1.6538 | 197.1206 | 3832.29 |

FIG. 1 showed fitting curves for evaluating bioavailabilities of the rice straws with different particle sizes by the anaerobic conversion based on fractal dimension.

EXAMPLE 2

A method for evaluating a bioavailability of organic solid waste by a biological anaerobic conversion based on fractal dimension includes the following steps.

1) A sample of a rice straw was collected, and dried and broken up to 3000 mm, and then was pretreated to obtain a dried sample.

2) The dried sample obtained in step (1) was diluted with pure water in a container to obtain a mixture with a solid content less than 5%, and the mixture was fully stirred by an external magnetic stirrer having a magnetic stirring bar. The container and the magnetic stirring bar were cleaned and dried before use.

3) The mixture obtained in step (2) was analyzed using a laser particle size analyzer, so as to measure a wave vector Q and a scattering intensity I of the mixture. A light source of the laser particle size analyzer was a helium-neon laser emitting at 633 nm. A refractive index of a dispersant was 1.330. An absorption rate of particles in the dispersant was 0.100. A density of the dispersant was greater than 1. The dispersant was water. Time for a background measurement was 10 s. Time for measuring the mixture was 10-12 s. Time for measuring the mixture with uneven dispersion was 10-20 s. Each mixture was measured 3 times. During a measurement, a shading range of a mixture containing particles having a diameter of tens of microns was 10-20%; a shading range of a mixture containing particles having a diameter of a few microns was 6-10%; a shading range of a mixture containing particles have a diameter of hundreds of nanometers was 4-6%; and a shading range of a mixture with uneven dispersion was 10-20%. A stirring speed was 2000-3000 r/min. After each mixture was measured, a cleaning system of the laser particle size analyzer is operated before the following measurement.

4) Based on fractal theory, the wave vector Q and the scattering light intensity I obtained in step (3) were analyzed using a data processing software. According to the formula $I \propto Q^{-D_f}$, an equation $I = k \cdot Q^{-D_f}$ was obtained, where k was a slope. Both sides of the equation took the natural logarithm to obtain: $\ln I = \ln (k \cdot Q^{-D_f})$, and then the equation was simplified as: $\ln I = -D_f \ln Q + \ln k$. The I and Q obtained in step (3) took the natural logarithm to obtain lnI and lnQ which were taken as a dependent variable and an independent variable, respectively, and the fractal dimension $D_f$ of the rice straw was obtained using linear fitting.

5) According to data from documents and experiments, the fractal dimensions $D_f$ of rice straws pretreated by different methods, and corresponding $VFA_{max}$ and BMP were obtained, and then were input into a data processing software to carry out the linear fitting to establish a model:

$$Y=A-BX,$$

where X was the fractal dimension $D_f$; Y was $VFA_{max}$ or BMP of the sample; and A and B were coefficients of the model corresponding to the $VFA_{max}$ or the BMP.

6) The fractal dimension $D_f$ of the rice straw was plugged into the model established in step (5), and the $VFA_{max}$ and the BMP thereof were calculated, so as to evaluate a bioavailability of the rice straw. Table 2 showed the $D_f$, BMP and $VFA_{max}$ of rice straws pretreated by different method.

TABLE 2

| Methods | $D_f$ | BMP | $VFA_{max}$ |
| --- | --- | --- | --- |
| No pretreatment | 1.9375 | 118.4744 | 1787.788 |
| Hydrothermal treatment | 1.8908 | 130.1265 | 2115.5 |
| Hydrothermal treatment + potassium hydroxide | 1.8016 | 152.3828 | 2741.452 |
| Hydrothermal treatment + potassium hydroxide + sodium sulfite | 1.7406 | 167.6029 | 3169.514 |
| Hydrothermal treatment + sodium sulfite | 1.8065 | 151.1602 | 2707.067 |
| Hydrothermal treatment + acetic acid | 1.8253 | 146.4694 | 2575.14 |
| Hydrothermal treatment + formaldehyde | 1.8194 | 147.9415 | 2616.542 |
| Hydrothermal treatment + hydrochloric acid | 1.7488 | 165.5569 | 3111.971 |
| Hydrothermal treatment + ferrous chloride | 1.7831 | 156.9987 | 2871.274 |
| Hydrothermal treatment + tetrahydrofuran | 1.7839 | 156.7991 | 2865.66 |

Figure 2:
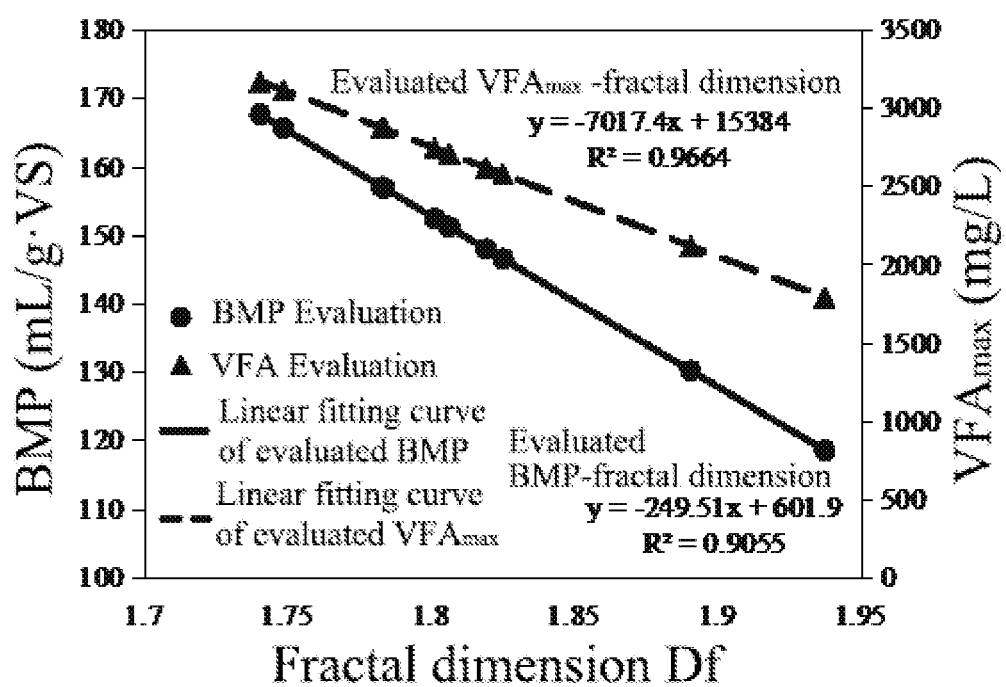
FIG. 2 shows fitting curves for evaluating bioavailabilities of rice straws pretreated by different methods according to an embodiment of the present disclosure.

FIG. 2 showed fitting curves for evaluating bioavailabilities of the rice straws pretreated by different methods.

EXAMPLE 3

A method for evaluating a bioavailability of organic solid waste by a biological anaerobic conversion based on fractal dimension includes the following steps.

1) Different kinds of straw were collected as samples, and dried and broken up to 0.55 mm to obtain dried samples.

2) Each of the dried samples obtained in step (1) was diluted with pure water in a container to obtain a mixture with a solid content less than 5%, and the mixture was fully stirred by an external magnetic stirrer having a magnetic stirring bar. The container and the magnetic stirring bar were cleaned and dried before use.

3) The mixture obtained in step (2) was analyzed using a laser particle size analyzer, so as to measure a wave vector Q and a scattering intensity I of the mixture. A light source of the laser particle size analyzer was a helium-neon laser emitting at 633 nm. A refractive index of a dispersant was 1.330. An absorption rate of particles in the dispersant was 0.100. A density of the dispersant was greater than 1. The dispersant was water. Time for a background measurement was 10 s. Time for measuring the mixture was 10-12 s. Time for measuring the mixture with uneven dispersion was 10-20 s. Each mixture was measured 3 times. During a measurement, a shading range of a mixture containing particles having a diameter of tens of microns was 10-20%; a shading range of a mixture containing particles having a diameter of a few microns was 6-10%; a shading range of a mixture containing particles have a diameter of hundreds of nanometers was 4-6%; and a shading range of a mixture with uneven dispersion was 10-20%. A stirring speed was 2000-3000 r/min. After each mixture was measured, a cleaning system of the laser particle size analyzer is operated before the following measurement.

4) Based on fractal theory, the wave vector Q and the scattering light intensity I obtained in step (3) were analyzed using data processing software. According to the formula $I \propto Q^{-D_f}$, an equation $I = k \cdot Q^{-D_f}$ was obtained, where k was a slope. Both sides of the equation took the natural logarithm to obtain: $\ln I = \ln(k \cdot Q^{-D_f})$, and then the equation was simplified as: $\ln I = -D_f \ln Q + \ln k$. The I and Q obtained in step (3) took the natural logarithm to obtain lnI and lnQ which were taken as a dependent variable and an independent variable, respectively, and the fractal dimension $D_f$ of the straw was obtained using linear fitting.

5) According to data from documents and experiments, the fractal dimensions $D_f$ of different kinds of straw, and corresponding $VFA_{max}$ and BMP were obtained, and then were input into a data processing software to carry out the linear fitting to establish a model:

$$Y=A-BX,$$

where X was the fractal dimension $D_f$; Y was $VFA_{max}$ or BMP of the sample; and A and B were coefficients of the model corresponding to the $VFA_{max}$ or the BMP.

6) The fractal dimension $D_f$ of each kind of straw was plugged into the model established in step (5), and the $VFA_{max}$ and the BMP thereof were calculated, so as to evaluate a bioavailability of each kind of straw. Table 3 showed the $D_f$, the BMP and the $VFA_{max}$ of different kinds of straws.

TABLE 3

| Materials | $D_f$ | BMP | $VFA_{max}$ |
| --- | --- | --- | --- |
| Wheat bran | 1.6501 | 190.1835 | 3804.588 |
| Straw powder | 1.6921 | 179.7041 | 3509.857 |
| Wheat flour | 1.7353 | 168.9253 | 3206.706 |
| Rape straw | 1.7837 | 156.849 | 2867.064 |
| Corn stalk | 1.6797 | 182.7981 | 3596.873 |
| Rice husk | 1.5907 | 205.0044 | 4221.422 |
| Soybean straw | 1.7034 | 176.8847 | 3430.561 |
| Peanut straw | 1.6185 | 198.0681 | 4026.338 |

Figure 3:
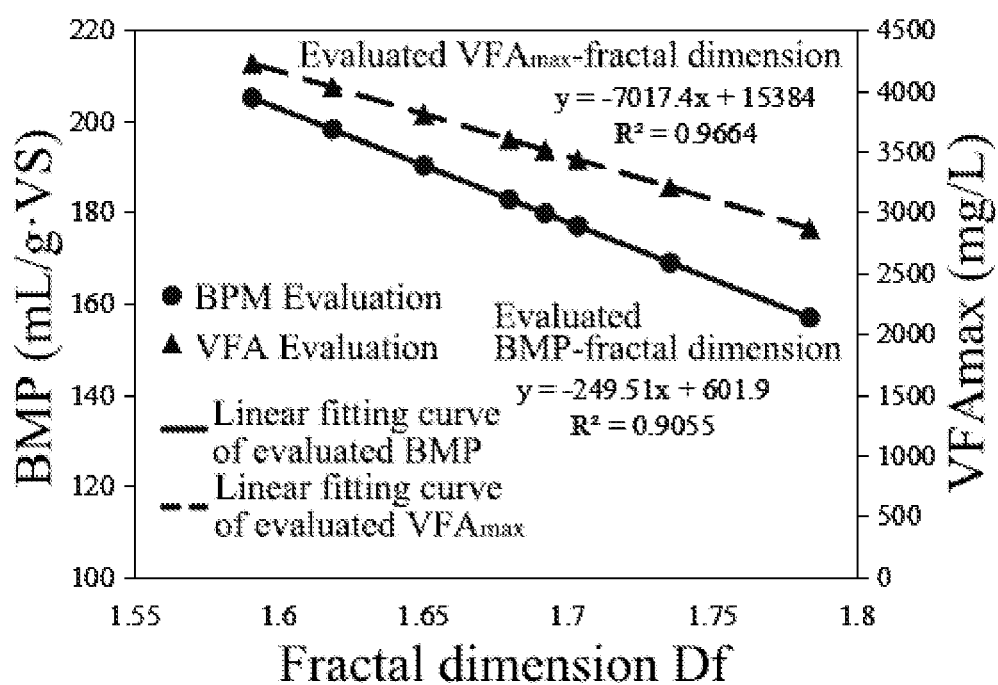
FIG. 3 shows fitting curves for evaluating bioavailabilities of the different kinds of straws according to an embodiment of the present disclosure.

FIG. 3 showed fitting curves for evaluating the bioavailabilities of different kinds of straws.

The above-mentioned embodiments are preferred embodiments, and not intended to limit the scope of this disclosure. For those skilled in the art, any variations and modifications without departing from the spirit of the present disclosure should fall within the scope of the appended claims.

What is claimed is:

1. A method for evaluating a bioavailability of organic solid waste by an anaerobic conversion based on fractal dimension, comprising:
   1) collecting a sample of the organic solid waste, and drying and breaking up the sample to obtain a dried sample;
   2) adding water into the dried sample obtained in step (1) followed by stirring to obtain a mixture;

3) analyzing the mixture obtained in step (2) using a laser particle size analyzer, so as to measure a wave vector Q and a scattering intensity I of the mixture;

4) analyzing the wave vector Q and the scattering intensity I obtained in step (3) using a data processing software to obtain a two-dimensional fractal dimension $D_f$ of the sample according to a formula $I \propto Q^{-D_f}$;

5) collecting and inputting the two-dimensional fractal dimension $D_f$, and corresponding maximum volatile fatty acid ($VFA_{max}$) or biochemical methane potential (BMP) into the data processing software to obtain data points; and fitting the data points using linear regression to obtain a calculation model of $VFA_{max}$ or BMP with respect to the fractal dimension $D_f$; and 6) plugging the fractal dimension $D_f$ of the sample into calculation model obtained in step (5) to obtain the $VFA_{max}$ or the BMP of the sample, so as to evaluate the bioavailability of the organic solid waste based on values of the $VFA_{max}$ or the BMP;

wherein in step (4), the formula $I \propto Q^{-D_f}$ is an equation $I = k \cdot Q^{-D_f}$, wherein k is a slope;

both sides of the equation take natural logarithm to obtain: $\ln I = \ln(k \cdot Q^{-D_f})$; then the equation is simplified as: $\ln I = -D_f \ln Q + \ln k$; the I and Q obtained in step (3) take the natural logarithm to obtain the $\ln I$ and $\ln Q$ which are taken as a dependent variable and an independent variable of the equation, respectively, and the fractal dimension $D_f$ of the sample is obtained using the linear regression;

in step (5), the calculation model of the $VFA_{max}$ or the BMP with respect to the fractal dimension $D_f$ is expressed as:

Y=A-BX, wherein X is the fractal dimension $D_f$; Y is the $VFA_{max}$ or the BMP of the sample; and A and B are coefficients of the calculation model of the $VFA_{max}$ or the BMP; and in step (6), the $VFA_{max}$ is a maximum cumulative value of a volatile organic acid in a hydrolysis acidification process without methane production; the BMP is a maximum potential for bioconversion of organic matter in the sample into methane in an anaerobic process; and the higher the values of the $VFA_{max}$ or the BMP are, the higher the bioavailability is.

2. The method of claim 1, wherein in step (1), the sample is organic solid waste pretreated by different treatment methods, organic solid waste collected from different areas, organic solid waste of different kinds or organic solid waste collected at different times.

3. The method of claim 2, wherein the sample is broken up to 0.01-3500 μm.

4. The method of claim 1, wherein in step (2), the sample is diluted with pure water in a container to obtain the mixture with a solid content less than 5%; the mixture is fully stirred by an external magnetic stirrer having a magnetic stirring bar; and the container and the magnetic stirring bar are cleaned and dried before use.

5. The method of claim 1, wherein in step (3), a light source of the laser particle size analyzer is a helium-neon laser emitting at 633 nm; a refractive index of a dispersant is 1.330; an absorption rate of particles in the dispersant is 0.100; a density of the dispersant is greater than 1; the dispersant is water; time for a background measurement is 10 s; time for measuring the mixture is 10-12 s; time for measuring the mixture with uneven dispersion is 10-20 s; the mixture is measured 3 times; during a measurement, a shading range of the mixture containing particles having a diameter of tens of microns is 10-20%; a shading range of the mixture containing particles having a diameter of a few microns is 6-10%; a shading range of the mixture containing particles have a diameter of hundreds of nanometers is 4-6%; a shading range of the mixture with uneven dispersion is 10-20%; a stirring speed is 2000-3000 r/min; and after the mixture is measured, a cleaning system of the laser particle size analyzer is operated.

* * * * *